United States Patent
Tu et al.

(10) Patent No.: US 12,295,077 B2
(45) Date of Patent: May 6, 2025

(54) INTELLIGENT ADJUSTMENT METHOD AND SYSTEM FOR LED BACKLIGHT DRIVE, DEVICE AND STORAGE MEDIUM

(71) Applicant: HYASIC INCORPORATION, Cupertino, CA (US)

(72) Inventors: Xi Tu, Shenzhen (CN); Chenglong Zhang, Shenzhen (CN); Junjie Zheng, Shenzhen (CN)

(73) Assignee: HYASIC INCORPORATION, Cupertino, CA (US)

( * ) Notice: Subject to any disclaimer, the term of this patent is extended or adjusted under 35 U.S.C. 154(b) by 162 days.

(21) Appl. No.: 18/206,636

(22) Filed: Jun. 7, 2023

(65) Prior Publication Data

US 2023/0328859 A1    Oct. 12, 2023

(30) Foreign Application Priority Data

Apr. 8, 2022    (CN) .......................... 202210367425.0

(51) Int. Cl.
*H05B 45/30*    (2020.01)
*H05B 45/325*   (2020.01)
*H05B 45/355*   (2020.01)
*H05B 45/48*    (2020.01)

(52) U.S. Cl.
CPC ......... *H05B 45/355* (2020.01); *H05B 45/325* (2020.01); *H05B 45/48* (2020.01)

(58) Field of Classification Search
CPC ...... H05B 45/10; H05B 45/30; H05B 45/325; H05B 45/355; H05B 45/48; H05B 47/10
See application file for complete search history.

(56) References Cited

U.S. PATENT DOCUMENTS

| | | | | |
|---|---|---|---|---|
| 2009/0273288 A1* | 11/2009 | Zhao | ...................... | H05B 45/38 |
| | | | | 315/185 R |
| 2018/0014370 A1* | 1/2018 | Wang | ...................... | H05B 45/18 |

* cited by examiner

*Primary Examiner* — Jimmy T Vu
(74) *Attorney, Agent, or Firm* — Winston Hsu

(57) ABSTRACT

An intelligent adjustment method and system for an LED backlight drive, a device and a storage medium are disclosed. The method includes: acquiring optimized channel current on each of other LED substring branches other than a non-maximum conduction branch; calculating, according to the optimized channel current, the number of cycles of conducting PWM of each LED substring branch in one frame of a frame synchronizing signal as the number of cycles of the optimized conducting PWM; and adjusting a channel current of each LED substring branch to be a corresponding optimized channel current, and adjusting the number of cycles of a conducting PWM of each LED substring branch to be the number of cycles of the optimized conducting PWM.

14 Claims, 5 Drawing Sheets

INTELLIGENT ADJUSTMENT METHOD AND SYSTEM FOR LED BACKLIGHT DRIVE, DEVICE AND STORAGE MEDIUM

BACKGROUND OF THE INVENTION

1. Field of the Invention

The present application relates to the technical field of circuit drive, and more particularly to an intelligent adjustment method and system for an LED backlight drive, a device and a storage medium.

The present application claims the priority of Chinese Patent Application No. 202210367425.0 filed on Apr. 8, 2022. The contents of the above application are hereby incorporated by reference.

2. Description of the Prior Art

In an LED backlight application, the most common application method is a common anode multi-path parallel connection method. As shown in FIG. 1, a common anode voltage VLED is provided by an AC-DC or DC-DC power supply. An anode (positive end) of a multi-path LED sub-string is coupled to the VLED, and a negative end of the LED substring is coupled to a channel of an LED drive chip. For example, as shown in FIG. 1, an LED module includes n paths of LED sub-strings. A negative end of each LED sub-string is coupled to a channel (CH1, . . . , CHn) of the LED drive chip. Each LED sub-string includes N LED grains connected in series.

Due to variations in the manufacturing processes, the forward conduction voltage VF of each LED grain is different. When multiple LED grains are connected in series into a lamp string, the difference in the total forward conduction voltage N*VF of different lamp strings is greater. The LED drive chip notifies the AC-DC or DC-DC power chip via an FB signal to regulate the VLED voltage to meet the needs of the lamp string with the maximum total forward conduction voltage.

For the LED light string, an increase in IF results in an increase in VF. When VLED is unchanged, VCH and then PCH decrease, thus reducing power consumption on the LED drive chip. The above-mentioned method can certainly improve power consumption and system efficiency. However, it is found in practical applications that such a design has a relatively large amount of calculation and consumes a large number of circuits, so that the static power consumption and area of the LED drive chip are relatively large.

SUMMARY OF THE INVENTION

The present application provides an intelligent adjustment method and system for an LED backlight drive, a device and a storage medium, aiming to improve the power consumption of an LED drive chip, reduce the area of the LED drive chip, improve the efficiency of the system, and solve the problem of a large amount of calculation of the LED drive chip.

According to a first aspect of the present application, an intelligent adjustment method for an LED backlight drive used for performing intelligent adjustment on the drive of an LED module is provided, wherein the LED module comprises multiple LED substrings; an anode of each LED substring is connected to a power supply, a cathode of each LED substring is respectively connected to a corresponding channel of an LED drive circuit, and each LED substring comprises a plurality of LED units connected in series; the method comprises: acquiring optimized channel current on each of other LED substring branches other than a non-maximum conduction branch; calculating, according to the optimized channel current, the number of cycles of conducting PWM of each LED substring branch in one frame of a frame synchronizing signal as the number of cycles of the optimized conducting PWM; and adjusting a channel current of each LED substring branch to be a corresponding optimized channel current, and adjusting the number of cycles of a conducting PWM of each LED substring branch to be the number of cycles of the optimized conducting PWM.

Optionally, before the acquiring optimized channel current, the method further comprises: setting average current, a duty ratio, a frame synchronizing signal, and the total number of cycles of PWM included in one frame of the frame synchronizing signal on each LED substring branch.

Optionally, the acquiring optimized channel current on each of other LED substring branches other than a non-maximum conduction branch is: acquiring maximum channel current on each of other LED substring branches other than the non-maximum conduction branch as the optimized channel current.

Optionally, the acquiring maximum channel current on each of other LED substring branch other than the non-maximum conduction branch comprises: increasing current on each of the other LED substring branches other than the non-maximum conduction branch until a preset marking signal on the corresponding LED substring branch is triggered; wherein the marking signal is used for characterizing being triggered when current passing through the corresponding LED substring reaches a maximum value; and recording the current that triggers the marking signal, which is the maximum channel current on the corresponding LED substring branch.

Optionally, the LED drive circuit is provided with a detection channel, and the marking signal is preset in the detection channel.

Optionally, the calculating, according to the optimized channel current, the number of cycles of conducting PWM of each LED substring branch in one frame of a frame synchronizing signal is made according to the formula $$Iavg = \text{ICH\_peak} \times \frac{n}{K};$$

wherein Iavg is an average current of the corresponding LED substring branch; ICH_peak is maximum channel current of the corresponding LED substring branch; n is the number of cycles of conducting PWM in one frame, and k is the total number of cycles of PWM included in one frame; n and k are positive integers, and n≤k.

Optionally, the acquiring optimized channel current on each of other LED substring branches other than a non-maximum conduction branch is: acquiring current closest to the maximum channel current on each of other LED substring branches other than the non-maximum conduction branch as the optimized channel current.

Optionally, the acquiring current closest to the maximum channel current on each of other LED substring branches other than the non-maximum conduction branch as optimized channel current comprises: acquiring maximum channel current on each of other LED substring branch other than the non-maximum conduction branch; for each LED substring branch, according to the formula ICH=Iavg*k/n, selecting n as 1, 2, . . . , k, calculating and obtaining alternative values of a group of channel current ICH; wherein ICH is channel current; Iavg is average current of a corresponding LED substring branch; n is the number of cycles of a conducting PWM in one frame, and k is the total number of cycles of the PWM included in one frame; N and k are positive integers, and n≤k; and selecting current from the alternative values that is less than but closest to the maximum channel current as the optimized channel current.

Optionally, the value of n corresponding to the optimized channel current is the number of cycles of the optimized conducting PWM.

Optionally, the intelligent adjustment method for the LED backlight drive further comprises: setting a duty ratio of each LED substring branch as an adjustable value.

According to a second aspect of the present application, an intelligent adjustment system for an LED backlight drive for realizing the intelligent adjustment method for the LED backlight drive according to the first aspect of the present application is provided, the system comprising: a current measurement module configured for measuring and acquiring optimized channel current on each of other LED substring branches other than a non-maximum conduction branch; a calculation module configured for calculating, according to the optimized channel current, the number of cycles of conducting PWM of each LED substring branch in one frame of a frame synchronizing signal as the number of cycles of the optimized conducting PWM; and a setting module configured for setting channel current of each LED substring branch to be a corresponding optimized channel current, and setting the number of cycles of a conducting PWM of each LED substring branch to be the number of cycles of the optimized conducting PWM.

Optionally, the system further comprises a parameter setting module configured for setting average current, a duty ratio, a frame synchronizing signal, and the total number of cycles of PWM included in one frame of the frame synchronizing signal on each LED substring branch.

According to a third aspect of the present application, an electronic device comprising a processor and a memory is provided; the memory stores a program invoked by the processor; the processor, when executing the program, implements an intelligent adjustment method for an LED backlight drive as described in any of the first aspect of the present application.

According to a fourth aspect of the present application, a computer readable storage medium is provided; the computer readable storage medium has program instructions stored therein; a processor performs the intelligent adjustment method for the LED backlight drive according to the first aspect of the present application when the program instructions are executed by the processor of the computer.

The intelligent adjustment method and system for the LED backlight drive, the device and the storage medium provided by the present application include obtaining the number of cycles of conducting PWM of each LED substring branch under optimized channel current by acquiring the optimized channel current, and adjusting the channel current of the LED substring to the corresponding optimized channel current, and adjusting the number of cycles of the LED substring to the number of cycles of PWM under the optimized channel current, thereby improving the power consumption of the LED drive chip, reducing the area of the LED drive chip, improving the efficiency of the system, and solving the problem of a large amount of calculation of the LED drive chip.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In order to more clearly describe the technical solutions in the embodiments of the application or the prior art, the drawings to be used in the description of the embodiments or the prior art will be briefly introduced below. It will be apparent to those skilled in the art that the drawings in the following description are only some of the application, and that other drawings may be obtained from the drawings without any creative works.

DETAILED DESCRIPTION

Figure 1:
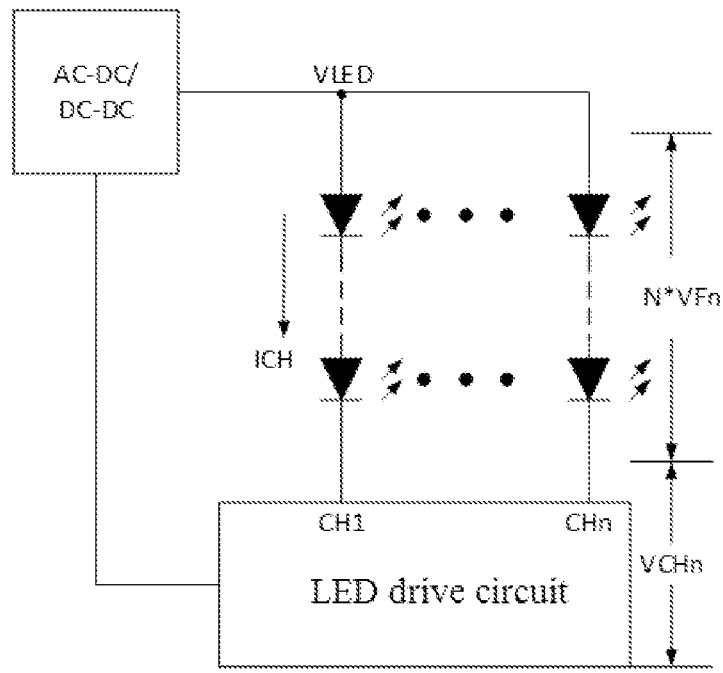
FIG. 1 is a schematic diagram of the drive structure of an LED module.
Figure 2:
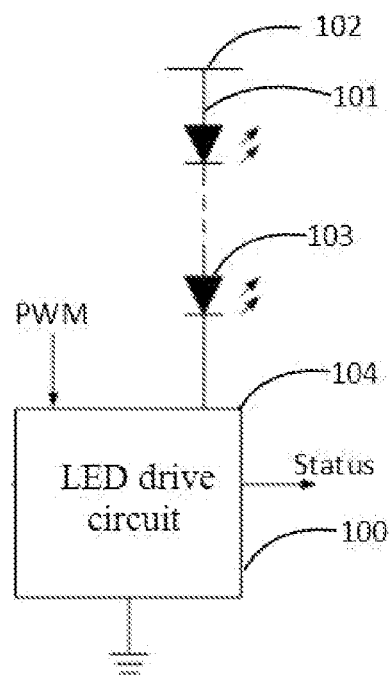
FIG. 2 is a structurally schematic diagram of a circuit for acquiring maximum channel current in an embodiment of the present application.

The technical solutions in the embodiments of the application will be described clearly and completely in conjunction with the accompanying drawings in the embodiments of the application. Obviously, the described embodiments are only part of the embodiments of the application, rather than all of the embodiments. Based on the embodiments in the application, all other embodiments obtained by a person skilled in the art without involving any inventive effort are within the scope of protection of the application.

The terms "first", "second", "third", "fourth", and the like in the description and claims of the present application and in the above-described figures, if any, are used for distinguishing between similar objects and not necessarily for describing a particular sequential or chronological order. It should be understood that the data so used may be interchanged, where appropriate, so that the embodiments of the application described herein can be implemented in an order other than those illustrated or described herein. Furthermore, the terms "comprise" and "comprising", as well as any variations thereof, are intended to cover a non-exclusive inclusion. For example, a process, a method, a system, an article, or a device that comprises a list of steps or elements is not necessarily limited to those steps or elements expressly listed, but may include other steps or elements not expressly listed or inherent to such process, method, article, or device.

Hereinafter, technical solutions of the present application will be described in detail with reference to specific embodiments. The following specific embodiments may be combined with one another, and the same or similar concepts or processes may not be repeated in some embodiments.

With reference to FIGS. 1 to 4, in an embodiment of the present application, an intelligent adjustment method for an LED backlight drive used for performing intelligent adjustment on the drive of an LED module 100 is provided. The LED module includes multiple LED substring branches 101. An anode of each LED substring is connected to a power supply 102, a cathode of each LED substring branch 101 is respectively connected to a corresponding channel of an LED drive circuit 104, and each LED substring branch 101 includes a plurality of LED units 103 connected in series. The method includes:

S2, acquiring optimized channel current ICH_opt on each of other LED substring branches 101 other than a non-maximum conduction branch.

Specifically, the maximum channel current ICH_peak on each of other LED substring branches 101 other than the non-maximum conduction branch is acquired as the optimized channel current ICH_opt. The non-maximum conduction branch refers to a branch in which the total number of cycles of conducting PWM in one frame is less than k.

Figure 3:
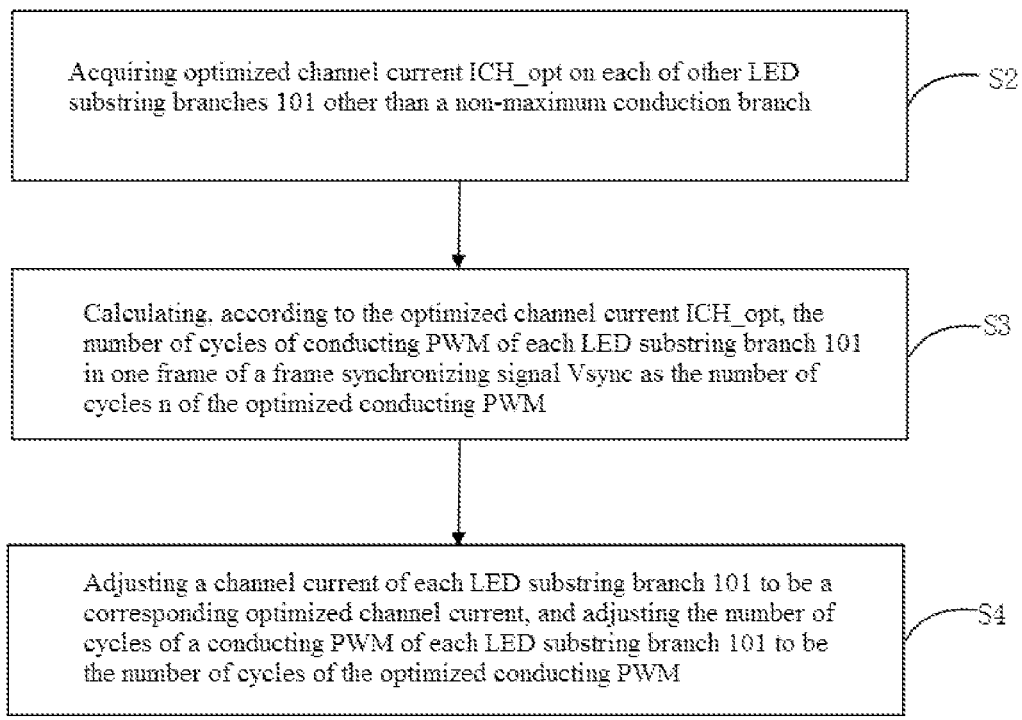
FIG. 3 is a schematic diagram of the general flow of an intelligent adjustment method for an LED backlight drive in an embodiment of the present application.

With continued reference to FIG. 3, the acquiring maximum channel current ICH_peak on each of other LED substring branch 101 other than the non-maximum conduction branch includes:

S21, increasing the current on each of other LED substring branches 101 other than the non-maximum conduction branch until a preset marking signal Status on the corresponding LED substring branch 101 is triggered.

Herein, the marking signal Status is used for characterizing being triggered when the current passing through the corresponding LED substring branch 101 reaches a maximum value.

S22, recording the current that triggers the marking signal Status, which is the maximum channel current ICH_peak on the corresponding LED substring branch.

The LED drive circuit is provided with a detection channel, and the marking signal Status is preset in the detection channel.

S3, calculating, according to the optimized channel current ICH_opt, the number of cycles of conducting PWM of each LED substring branch 101 in one frame of a frame synchronizing signal Vsync as the number of cycles n of the optimized conducting PWM.

According to the optimized channel current ICH_opt, the number of cycles of conducting PWM of each LED substring branch 101 in one frame of the frame synchronizing signal Vsync is calculated according to the formula:

$$Iavg = \text{ICH\_peak} \times \frac{n}{K};$$

where Iavg is an average current of the corresponding LED substring branch 101; ICH_peak 101 is maximum channel current of the corresponding LED substring branch 101; n is the number of cycles of conducting PWM in one frame, and k is the total number of cycles of PWM included in one frame; n and k are positive integers, and n≤k.

S4, adjusting a channel current of each LED substring branch 101 to be a corresponding optimized channel current, and adjusting the number of cycles of a conducting PWM of each LED substring branch 101 to be the number of cycles of the optimized conducting PWM.

Figure 4:
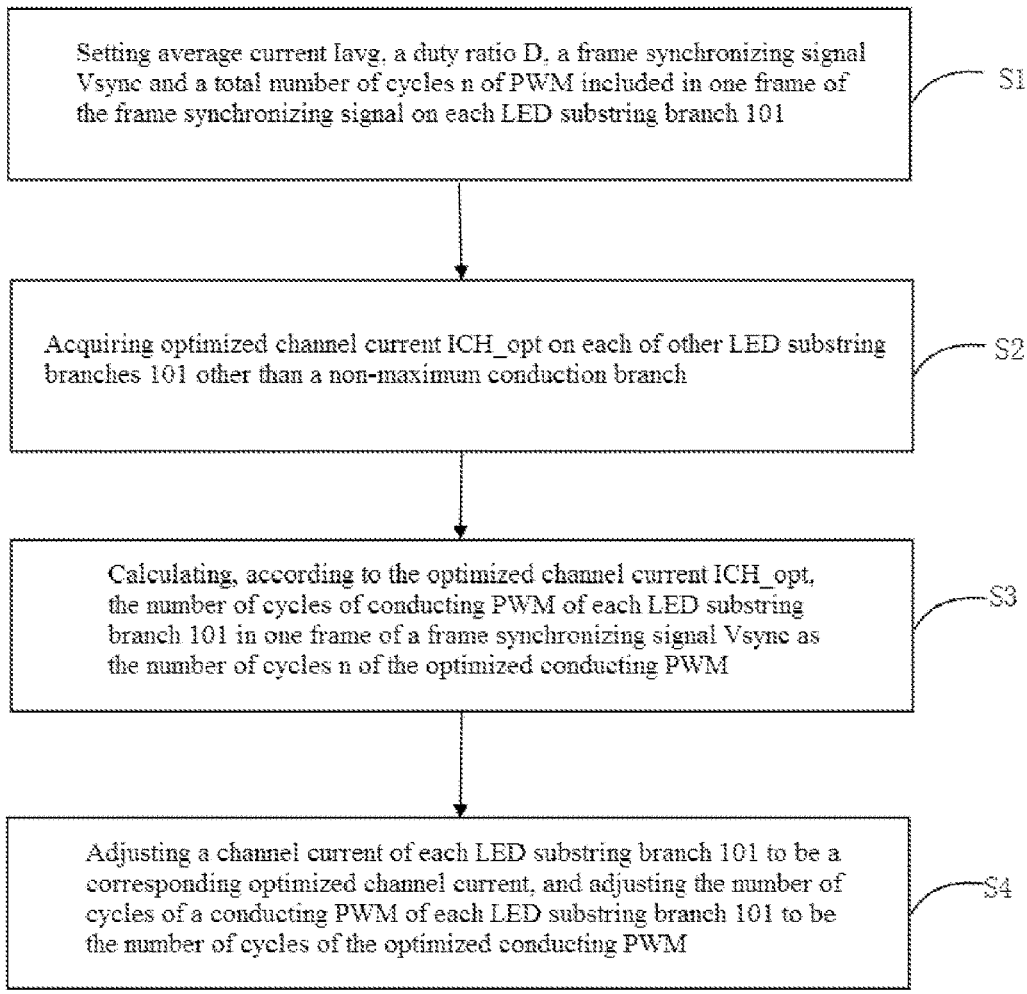
FIG. 4 is a schematic diagram of the flow of the intelligent adjustment method for an LED backlight drive in an embodiment of the present application.
Figure 5:
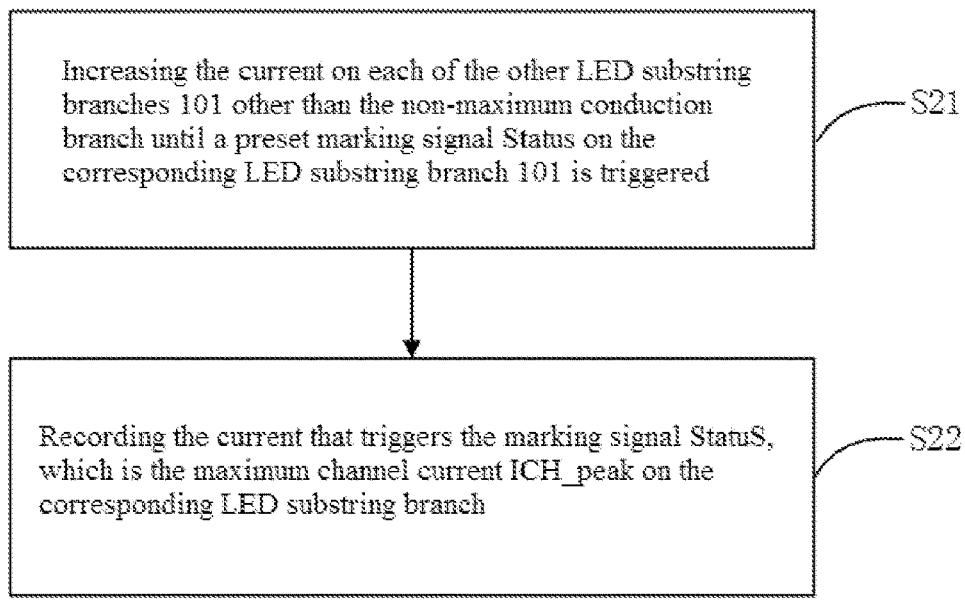
FIG. 5 is a schematic diagram of the flow for acquiring optimized channel current in an embodiment of the present application.

With continued reference to FIG. 4, the step S1 is further included before step S2, including setting average current Iavg, a duty ratio D, a frame synchronizing signal Vsync and the total number of cycles k of PWM included in one frame of the frame synchronizing signal on each LED substring branch 101.

Figure 6:
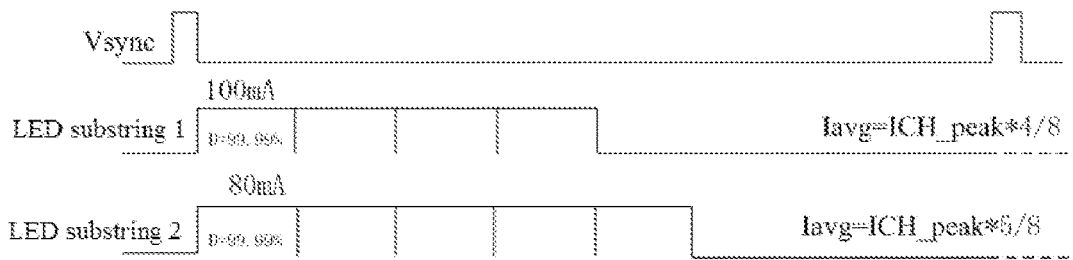
FIG. 6 is a waveform diagram of an intelligent adjustment method for an LED backlight drive in an embodiment of the present application.

Herein, the duty ratio D refers to a ratio of the conducting time to the total time within a single PWM period. In order to simplify the calculation, in the present embodiment, the duty ratio of each LED substring branch 101 remains the same. As shown in FIG. 6, the duty ratio of each LED substring branch is 99.99%.

In order to intuitively show the intelligent adjustment method for the LED backlight drive in the above-mentioned embodiment. FIG. 6 shows the adjustment method in the embodiment as a waveform. As shown in FIG. 6, the average current Iavg, the duty ratio D (specifically, for example, 99.99%), the frame synchronizing signal Vsync and total number of cycles k of PWM (specifically, for example, k=8) included in one frame of the frame synchronizing signal of each LED substring branch are set. For the LED substring 1, if the maximum channel current ICH_peak thereof is measured to be 100 mA, then by $$Iavg = \text{ICH\_peak} \times \frac{n}{K}$$

a corresponding n value can be obtained. For example, the n value of the LED substring 1 in FIG. 6 is 4, and the n value of the LED substring 2 is 5, then the optimized channel current of the LED substring 1 is adjusted to 100 mA, and the n value is adjusted to 4. Correspondingly, the total duty ratio of the LED substring 1 is 4/8*99.99%, the optimized channel current of the LED substring 2 is adjusted to 80 mA, and the n value is adjusted to 5. Correspondingly, the total duty ratio of the LED substring 2 is 5/8*99.99%. Other substrings are treated similarly.

In another embodiment of the present application, the acquiring optimized channel current ICH_opt on each of other LED substring branches 101 other than a non-maximum conduction branch specifically includes: acquiring current closest to the maximum channel current on each of other LED substring branches 101 other than the non-maximum conduction branch as the optimized channel current ICH_opt.

Figure 7:
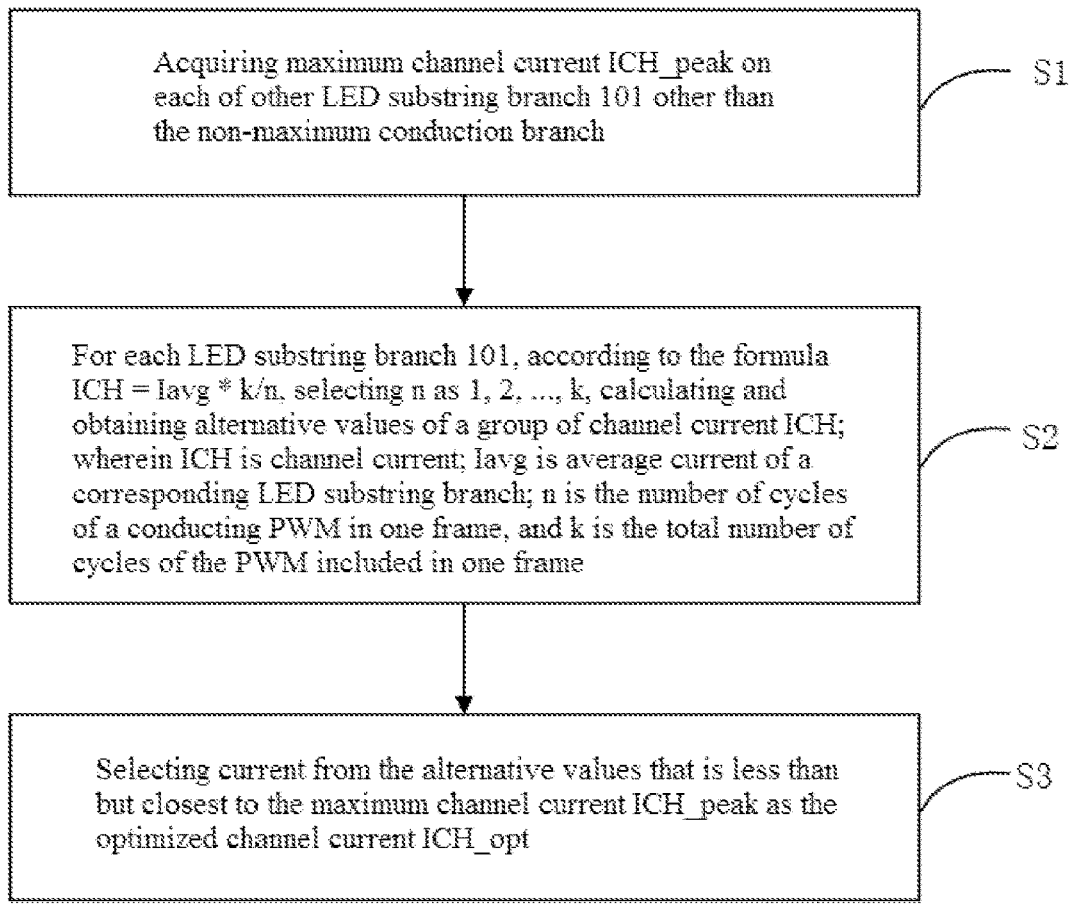
FIG. 7 is a flow chart for acquiring maximum channel current in another embodiment of the present application.

Herein, with reference to FIG. 7, the acquiring current closest to the maximum channel current on each of other LED substring branches 101 other than the non-maximum conduction branch as the optimized channel current ICH_opt specifically includes:

S1, acquiring maximum channel current ICH_peak on each of other LED substring branch 101 other than the non-maximum conduction branch.

S2, for each LED substring branch 101, according to the formula ICH=Iavg*k/n, selecting n as 1, 2, . . . , k, calculating and obtaining alternative values of a group of channel current ICH; wherein ICH is channel current; Iavg is average current of a corresponding LED substring branch; n is the number of cycles of a conducting PWM in one frame, and k is the total number of cycles of the PWM included in one frame; n and k are positive integers, and n≤k.

Herein, the value of n corresponding to the optimized channel current is the number of cycles of the optimized conducting PWM.

S3, selecting current from the alternative values that is less than but closest to the maximum channel current ICH_peak as the optimized channel current ICH_opt.

In a specific embodiment, average current, a duty ratio, a frame synchronizing signal and the total number of cycles of PWM included in one frame of the frame synchronizing signal on each LED substring branch are known. The total number of cycles of PWM included in one frame of the frame synchronizing signal Vsync and the frame synchronizing signal Vsync is 8. Firstly, a maximum channel current ICH_peak is obtained by the marking signal Status in a detection channel set in an LED drive circuit. Each LED substring branch 101 selects k as 8 according to the formula ICH=Iavg*k/n. n is a positive integer less than or equal to 8. A group of alternative values of the channel current ICH are obtained by calculation. The current closest to and less than the maximum channel current ICH_peak is selected from the group of alternative values of the current ICH as the optimized channel current ICH_opt, where the number of cycles of PWM corresponding to the optimized channel current ICH_opt is the number of cycles of the optimized conducting PWM.

Compared with taking the maximum channel current ICH_peak as the optimized channel current, this embodiment takes into account that the number of cycles n of the conducting PWM within one frame is a discrete value (for example, 1, 2, 3, . . . , 8), and thus the maximum channel current ICH_peak obtained by the marking signal Status may not satisfy the basic constraint:

$$Iavg = \text{ICH\_peak} \times \frac{n}{K}$$

Figure 8:
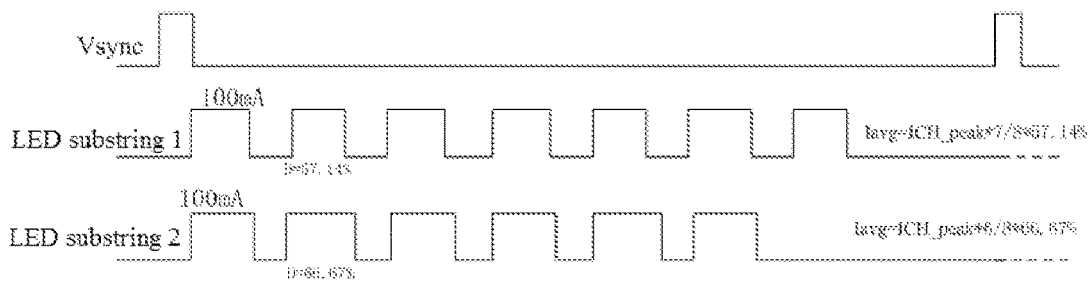
FIG. 8 is a waveform diagram of an intelligent adjustment method for an LED backlight drive in another embodiment of the present application.

It is therefore more accurate in this embodiment to optimize the channel current ICH_opt with the current closest to and less than the maximum channel current ICH_peak. In the foregoing embodiment, the intelligent adjustment method for the LED backlight drive is performed only by changing the number of cycles n of the conducting PWM within one frame. In other embodiments, the duty ratio of each LED substring branch may also be changed simultaneously. For example, as shown in FIG. 8, the duty ratio D of LED substring 1 may be for example 57.14%, and the duty ratio D of LED substring 2 may be for example 66.67%. Under the condition of the average current Iavg, the duty ratio D, the frame synchronizing signal Vsync and the total number of cycles k of PWM (specifically, for example, 8) included in one frame of the frame synchronizing signal of each LED substring branch are set, for the LED substring 1, if the maximum channel current ICH_peak thereof is measured to be 100 mA, then by $$Iavg = ICH_{peak} \times \frac{n}{K} \times 57.14\%,$$

a corresponding n value can be obtained. For example, if then value of LED substring 1 in FIG. 8 is 7 and the n value of the LED substring 2 is 6, then the optimized channel current of the LED substring 1 is adjusted to 100 mA, and the n value adjusted to 7. Correspondingly, the total duty ratio of the LED substring 1 is 7/8×57.14%. The optimized channel current of the LED substring 2 is adjusted to 100 mA, and the n value adjusted to 6. Correspondingly, the total duty ratio of the LED substring 2 is 6/8×66.67%. Other substrings are treated similarly.

Figure 9:
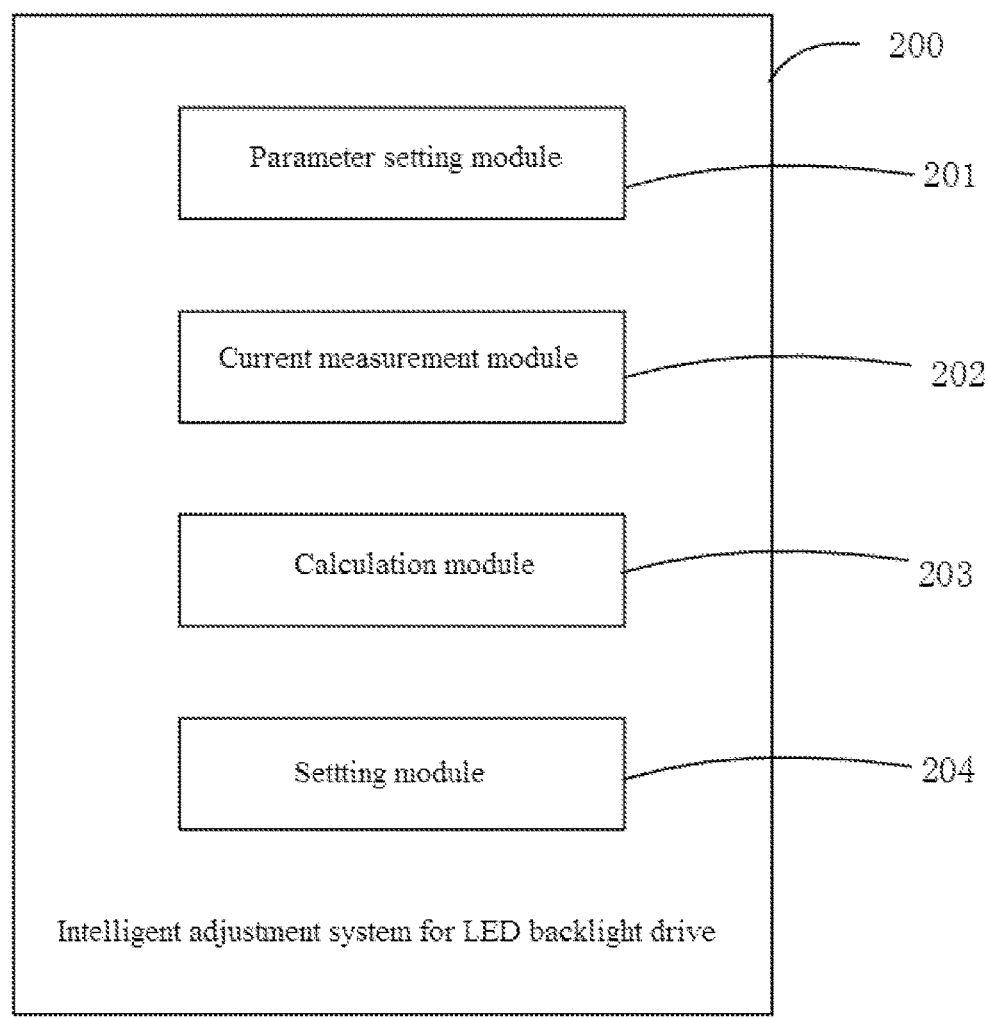
FIG. 9 is a module diagram of an intelligent adjustment system for an LED backlight drive in an embodiment of the present application.

With reference to FIG. 9, an embodiment of the present application also provides an intelligent adjustment system for an LED backlight drive 200 for realizing the above-mentioned intelligent adjustment method for the LED backlight drive. The system includes:

a current measurement module 202 configured for measuring and acquiring optimized channel current on each of other LED substring branches other than a non-maximum conduction branch;

a calculation module 203 configured for calculating, according to the optimized channel current, the number of cycles of conducting PWM of each LED substring branch in one frame of a frame synchronizing signal as the number of cycles of the optimized conducting PWM; and a setting module 204 configured for setting channel current of each LED substring branch to be a corresponding optimized channel current, and setting the number of cycles of a conducting PWM of each LED substring branch to be the number of cycles of the optimized conducting PWM.

Of course, the system further includes a parameter setting module 201 configured for setting average current, a duty ratio, a frame synchronizing signal, and the total number of cycles of PWM included in one frame of the frame synchronizing signal on each LED substring.

Figure 10:
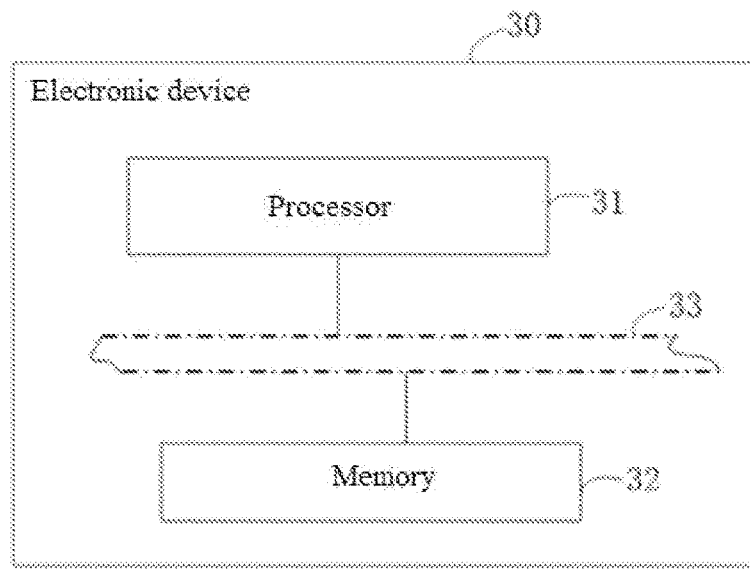
FIG. 10 is a schematic diagram of the construction of an electronic device in an embodiment of the present application.

Referring to FIG. 10, an embodiment of the present application also provides an electronic device 30 including a processor 31 and a memory 32. The memory 32 stores a program which can be invoked by the processor 3. When executing the program, the processor 31 can communicate with the memory 32 via a bus 33 so as to realize the above-mentioned intelligent adjustment method for the LED backlight drive.

According to embodiments of the application, a computer readable storage medium is provided. The computer readable storage medium has program instructions stored therein. A processor performs the intelligent adjustment method for the LED backlight drive when the program instructions are executed by the processor of the computer.

The intelligent adjustment method and system for the LED backlight drive, the device and the storage medium provided by the present application include obtaining the number of cycles of conducting PWM of each LED substring branch under optimized channel current by acquiring the optimized channel current, adjusting the channel current of the LED substring to the corresponding optimized channel current, and adjusting the number of cycles of the LED substring to the number of cycles of PWM under the optimized channel current, thereby improving the power consumption of the LED drive chip, reducing the area of the LED drive chip, improving the efficiency of the system, and solving the problem of a large amount of calculation of the LED drive chip.

Finally, it should be noted that each embodiment above are only intended to illustrate the technical solution of the application, but not to limit it. Although the application has been described in detail with reference to the each foregoing embodiment, those skilled in the art will appreciate that the technical solutions of the each above-mentioned embodiment can still be modified, or some of the technical features thereof can be equivalently substituted. Such modifications and substitutions will not cause the essence of the corresponding technical solutions to depart from the scope of the embodiments of the application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent adjustment method for an LED backlight drive used for performing intelligent adjustment on the drive of an LED module, wherein the LED module comprises multiple LED substrings; an anode of each LED substring is connected to a power supply, a cathode of each LED substring is respectively connected to a corresponding channel of an LED drive circuit, and each LED substring comprises a plurality of LED units connected in series; wherein the method comprises:
    acquiring optimized channel current on each of other LED substring branches other than a non-maximum conduction branch;
    calculating, according to the optimized channel current, a number of cycles of a conducting PWM of each LED substring branch in one frame of a frame synchronizing signal as a number of cycles of an optimized conducting PWM; and
    adjusting a channel current of each LED substring branch to be a corresponding optimized channel current, and adjusting the number of cycles of conducting PWM of each LED substring branch to be the number of cycles of the optimized conducting PWM.

2. The intelligent adjustment method for the LED backlight drive according to claim 1, wherein
    before the acquiring optimized channel current, the method further comprises:
    setting average current, a duty ratio, a frame synchronizing signal, and the total number of cycles of PWM included in one frame of the frame synchronizing signal on each LED substring branch.

3. The intelligent adjustment method for the LED backlight drive according to claim 2, wherein
    the acquiring optimized channel current on each of other LED substring branches other than a non-maximum conduction branch is: acquiring maximum channel current on each of other LED substring branches other than the non-maximum conduction branch as the optimized channel current.

4. The intelligent adjustment method for the LED backlight drive according to claim 3, wherein
    the acquiring maximum channel current on each of other LED substring branch other than the non-maximum conduction branch comprises:
    increasing current on each of the other LED substring branches other than the non-maximum conduction branch until a preset marking signal on the corresponding LED substring branch is triggered; wherein the marking signal is used for characterizing being triggered when current passing through the corresponding LED substring reaches a maximum value; and
    recording the current that triggers the marking signal, which is the maximum channel current on the corresponding LED substring branch.

5. The intelligent adjustment method for the LED backlight drive according to claim 4, wherein
    the LED drive circuit is provided with a detection channel, and the marking signal is preset in the detection channel.

6. The intelligent adjustment method for the LED backlight drive according to claim 4, wherein
    the calculating, according to the optimized channel current, the number of cycles of conducting PWM of each LED substring branch in one frame of a frame synchronizing signal is made according to the formula:

$$Iavg = ICH\_peak \times \frac{n}{K};$$

wherein Iavg is an average current of the corresponding LED substring branch; ICH_peak is maximum channel current of the corresponding LED substring branch; n is the number of cycles of conducting PWM in one frame, and k is the total number of cycles of PWM included in one frame; N and k are positive integers, and n≤k.

7. The intelligent adjustment method for the LED backlight drive according to claim 2, wherein
    the acquiring optimized channel current on each of other LED substring branches other than a non-maximum conduction branch is; acquiring current closest to the maximum channel current on each of other LED substring branches other than the non-maximum conduction branch as the optimized channel current.

8. The intelligent adjustment method for the LED backlight drive according to claim 7, wherein
    the acquiring current closest to the maximum channel current on each of other LED substring branches other than the non-maximum conduction branch as the optimized channel current comprises:
    acquiring maximum channel current on each of other LED substring branch other than the non-maximum conduction branch;
    for each LED substring branch, according to the formula ICH=Iavg*k/n, selecting n as 1, 2, . . . , k, calculating and obtaining alternative values of a group of channel current ICH; wherein ICH is channel current; Iavg is average current of a corresponding LED substring branch; n is the number of cycles of a conducting PWM in one frame, and k is the total number of cycles of the PWM included in one frame; n and k are positive integers, and n≤k; and
    selecting current from the alternative values that is less than but closest to the maximum channel current as the optimized channel current.

9. The intelligent adjustment method for the LED backlight drive according to claim 8, wherein
    the value of n corresponding to the optimized channel current is the number of cycles of the optimized conducting PWM.

10. The intelligent adjustment method for the LED backlight drive according to claim 1, wherein the method further comprises:
    setting a duty ratio of each LED substring branch as an adjustable value.

11. An intelligent adjustment system for an LED backlight drive for realizing the intelligent adjustment method for the LED backlight drive as claimed in claim 1, wherein the system comprises:

a current measurement module configured for measuring and acquiring optimized channel current on each of other LED substring branches other than the non-maximum conduction branch;

a calculation module configured for calculating, according to the optimized channel current, the number of cycles of conducting PWM of each LED substring branch in one frame of the frame synchronizing signal as the number of cycles of the optimized conducting PWM; and a setting module configured for setting channel current of each LED substring branch to be the corresponding optimized channel current, and setting the number of cycles of conducting PWM of each LED substring branch to be the number of cycles of the optimized conducting PWM.

12. The intelligent adjustment system for the LED backlight drive according to claim 11, wherein the system further comprises a parameter setting module configured for setting average current, a duty ratio, a frame synchronizing signal, and the total number of cycles of PWM included in one frame of the frame synchronizing signal on each LED substring branch.

13. An electronic device, comprising a processor and a memory, wherein the memory stores a program invoked by the processor; the processor, when executing the program, implements the intelligent adjustment method for the LED backlight drive as claimed in claim 1.

14. A computer readable storage medium, wherein the computer readable storage medium has program instructions stored therein; a processor performs the intelligent adjustment method for the LED backlight drive as claimed in claim 1 when the program instructions are executed by the processor of the computer.

* * * * *